United States Patent
Rimmer et al.

(10) Patent No.: US 8,918,461 B2
(45) Date of Patent: Dec. 23, 2014

(54) MATCHED COMMUNICATING DEVICES

(75) Inventors: Andrew Simon Rimmer, Worthing (GB); Andrew Jonathan Miles Wishart, Stelling Minnis (GB); Gikger Rikf Scholl, Herzogenrath (DE); Timothy J. Everett, Pulborough (GB); Robert N. Bates, St. Ives (GB)

(73) Assignee: Koninklijke Philips N.V., Eindhoven (NL)

( * ) Notice: Subject to any disclaimer, the term of this patent is extended or adjusted under 35 U.S.C. 154(b) by 289 days.

(21) Appl. No.: 12/809,111

(22) PCT Filed: Dec. 10, 2008

(86) PCT No.: PCT/IB2008/055214
§ 371 (c)(1),
(2), (4) Date: Jun. 18, 2010

(87) PCT Pub. No.: WO2009/081307
PCT Pub. Date: Jul. 2, 2009

(65) Prior Publication Data
US 2010/0312833 A1 Dec. 9, 2010

Related U.S. Application Data

(60) Provisional application No. 61/015,865, filed on Dec. 21, 2007.

(51) Int. Cl.
| | |
|---|---|
| G06F 15/16 | (2006.01) |
| H04N 7/14 | (2006.01) |
| G08B 21/04 | (2006.01) |
| H04N 7/18 | (2006.01) |
| G06F 15/173 | (2006.01) |

(52) U.S. Cl.
CPC ............... *H04N 7/147* (2013.01); *H04N 7/142* (2013.01); *G08B 21/0423* (2013.01); *G08B 21/0415* (2013.01); *H04N 7/185* (2013.01)
USPC ............................ 709/204; 709/222; 709/231

(58) Field of Classification Search
CPC ............ H04L 41/0681; H04L 12/2812; H04L 12/1827; H04L 12/2849; H04L 12/1831; H04L 12/282; H04L 29/06027; H04L 63/10; H04M 2250/64; H04N 7/142; H04N 7/147; H04N 7/185; G08B 21/0423; G08B 21/0415
USPC ......................................... 709/204, 222, 231
See application file for complete search history.

(56) References Cited

U.S. PATENT DOCUMENTS

| | | |
|---|---|---|
| 6,772,331 B1 | 8/2004 | Hind et al. |
| 6,970,183 B1 | 11/2005 | Monroe |

(Continued)

FOREIGN PATENT DOCUMENTS

| | | |
|---|---|---|
| EP | 1178460 B1 | 9/2006 |
| GB | 2384933 A | 8/2003 |

(Continued)

*Primary Examiner* — Alina N Boutah (57) ABSTRACT

A communication system includes first and second devices which are matched to each other. At least one of the matched devices includes an input device for capturing content; a memory for storing the content, and a renderer configured to render the content under the control of at least one processor which is configured to affect rendering of the content on the first device and/or the second device in response to at least one trigger. The least one trigger may be generated in response to detection of a user of the first device; passage of time the content has been rendered since a previous trigger; location of the user; behavioral pattern of the user; and/or traffic flow patterns between the first device and the second device.

21 Claims, 3 Drawing Sheets

(56) References Cited

U.S. PATENT DOCUMENTS

| | | | |
|---|---|---|---|
| 6,975,308 B1 | 12/2005 | Bitetto et al. | |
| 7,228,150 B1* | 6/2007 | Kim | 455/556.1 |
| 7,698,392 B2* | 4/2010 | Zapata et al. | 709/220 |
| 2003/0057887 A1 | 3/2003 | Dowling et al. | |
| 2004/0095359 A1 | 5/2004 | Simon et al. | |
| 2005/0252980 A1* | 11/2005 | Kim | 235/492 |
| 2006/0047375 A1 | 3/2006 | Eichamann | |
| 2006/0170669 A1 | 8/2006 | Walker et al. | |
| 2006/0170770 A1 | 8/2006 | MacCarthy | |
| 2006/0268183 A1 | 11/2006 | Dunko et al. | |
| 2007/0112944 A1* | 5/2007 | Zapata et al. | 709/221 |
| 2007/0150916 A1 | 6/2007 | Begole et al. | |
| 2007/0198682 A1* | 8/2007 | Pazhyannur et al. | 709/223 |

FOREIGN PATENT DOCUMENTS

| | | |
|---|---|---|
| GB | 2393348 A | 3/2004 |
| GB | 2393349 A | 3/2004 |
| JP | 2002218096 A | 8/2002 |
| WO | 9917213 | 4/1999 |
| WO | 2006127041 A1 | 11/2006 |
| WO | 2007120456 A1 | 10/2007 |
| WO | 2008129431 A2 | 10/2008 |

* cited by examiner

MATCHED COMMUNICATING DEVICES

This application claims the benefit of U.S. Provisional Patent Application Ser. No. 60/912,742, filed Apr. 19, 2007 and U.S. Provisional Patent Application Ser. No. 60/976,850, filed Oct. 2, 2007, which are both incorporated herein by reference in their entireties.

The present system relates to communication and monitoring methods and devices that are pre-matched to each other for communication and exchange of content, such as audio, video and any other data or information, for example.

Advances in communication technology are leading to increased communication among various people and devices, through various media and systems. Various communication choices are and becoming available, such as through wired and wireless systems, including mobile or cellular telephony, electronic email and Internet systems, for examples.

Several communication systems and devices are proposed to simplify communication or monitoring, and increase efficiency. For example WO 99/17213 to White, which is hereby incorporated by reference in its entirety, describes a communication system where additional devices may be easily integrated into the system, and does not require that each communication link between devices be separately established. Conventional monitoring systems include vehicle surveillance and control systems, as described in U.S. Patent Application Publication Nos. 2006/0170770 to MacCarthy and 2006/0047375 to Eichmann, which are hereby incorporated by reference in their entirety. Further, GB 2,384,933 to Ormson, which is hereby incorporated by reference in its entirety, describes a closed circuit television system that uses a cellular network. Full service, multi-media surveillance systems with automatic assessment and response are also known, such as described in U.S. Pat. No. 6,970,183 to Monroe, which is hereby incorporated by reference in its entirety.

Devices may be paired, such as permanently, exclusively on a long term basis, or only for the duration of a single transaction or data exchange, as described in U.S. Pat. No. 6,772,331 to Hind, which is hereby incorporated by reference in its entirety. Another method with a reduced level of security includes pairing devices via generation of an encryption/decryption key for each new communication session using a personal identification number (PIN) chosen by the device manufacturer, so that the paired devices can communicate with each other immediately upon removal from their shipping box, without any need for configuration by the user.

There is a need for simple communication systems and paired devices that allow for exchange of content and control information in a simple manner, where content is exchanged, rendered and updated in accordance with predetermined and/or selected settings, including being triggered and rendered in a desired fashion based on various settings, situations and triggers.

One object of the present systems and methods is to overcome the disadvantages of conventional communication systems and devices. According to one illustrative embodiment, a communication system includes first and second devices which are matched to each other. At least one of the matched devices includes an input device for capturing content; a memory for storing the content, and a renderer configured to render the content under the control of at least one processor. The processor(s) is configured to affect rendering of the content on the first device and/or the second device in response to at least one trigger. The at least one trigger may be generated in response to detection of a user of the first device; passage of time the content has been rendered since a previous trigger; location of the user; behavioral pattern of the user; and/or traffic flow patterns between the first device and the second device.

Further areas of applicability of the present devices, systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

These and other features, aspects, and advantages of the apparatus, systems and methods of the present invention will become better understood from the following description, appended claims, and accompanying drawing where:

The following description of certain exemplary embodiments is merely exemplary in nature and is in no way intended to limit the invention, its applications, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

U.S. Provisional Patent Application Ser. Nos. 60/912,742 and 60/976,850, which are incorporated herein by reference in its entirety, describe a pair of matched devices that each have the ability to capture and render data, such as images and sound. Images/Sound captured on one device are automatically made available to be rendered on the other. As the devices are paired (as part of the manufacture/pre sales process, for example), communication between require little or no end-user interaction.

Figure 1:
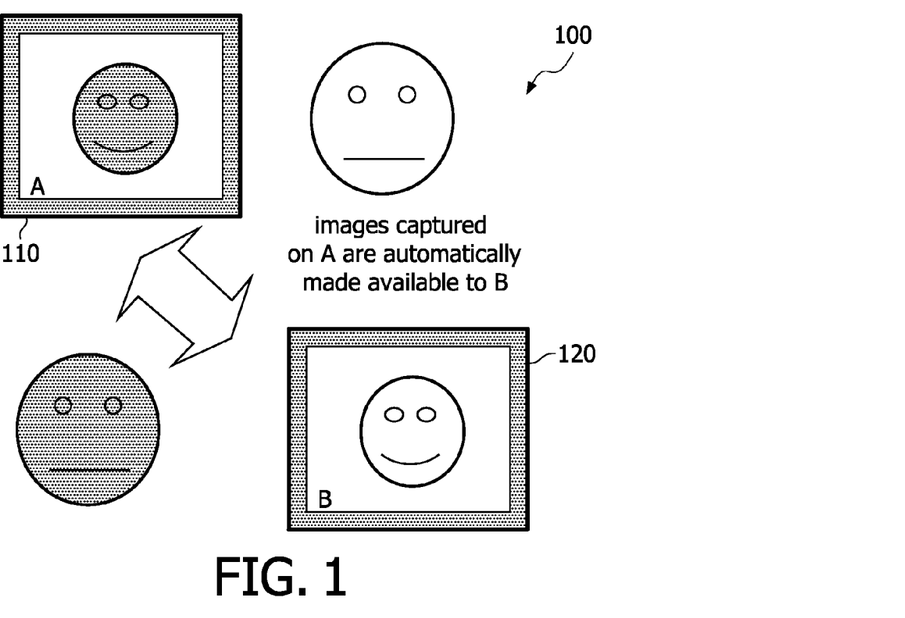
FIG. 1 shows communication devices according to one embodiment.

As described in U.S. Provisional Patent Application Ser. Nos. 60/912,742 and 60/976,850, FIG. 1 shows a system 100 according to an embodiment including a pair of devices 110, 120 that each have the ability to both capture and render content, such as images and sound, for example. The devices 110, 120 may be sold as a matched pair with in-built knowledge of the other's identity. Each device may have a display with integrated camera, speaker and microphone. Each device may further include an RFID reader, ports and slot connection to external peripherals and insertion of cards, such as memory cards and/or broadband (e.g., cellular) communication cards, a processor configured to decode data such as pictures/video, and a communication system, e.g., configured for wired and/or wireless communication such as WiFi communication.

The matched devices, whether two or more, may have communication with each other including video messaging, photo sending and printing (e.g., via an external printer connected to a port or wirelessly connected (e.g., via Bluetooth™) to a matched device), shared gaming, etc. Further, the matched devices may be used for monitoring. A master-slave relationship may also be one of the modes of operation where the master controls the slave, such as providing alarms or message, e.g., take your medicine, and continuously or periodically sends such messages or alarms to the slave until an acknowledgment is received from the slaved device in response to a user input acknowledging receipt of the message or performing the function indicated in the message received from the master, such as taking the medicine, doing the homework, locking the doors, etc.

In one embodiment, images and/or sound captured on one device are automatically made available to be rendered on the other device. In other embodiment, the user of the first device 110 may first request that content stored or captured by the first device be sent to the second device 120, and/or to further matched devices. Transmission of captured or stored content from one device to another may be in response to activating a key, which may be a hardware key on a frame of the device, or a software key displayed on a touch screen of the device. For example, merely touching the screen of the first device 110 may activate transmission of the displayed or selected content to the second device 120, or to further matched devices or to a, intermediary server 310, as will be described in connection with FIG. 3.

In a further embodiments, the user of the receiving device (e.g., the second device 120 and/or further matched devices), may elect to automatically receive, without further user interaction, content sent by the first device 110 (or sent by further matched devices). In addition or alternately, the user of the receiving device 120 may elect to accept rendering of content received from the transmitting device 110 or to chose which content to render, whether the content selected for rendering is newly sent by the first or transmitting device 110 (or sent by further matched devices) or previously sent and stored in the second device or in the server 310 connecting the one or more of the transmitting and receiving devices. Rendering the content may be playing music, in the case the where the received content is audio, and displaying images in the case where the received content is video, which may be streamed from the server 310, or first stored in the memory of the receiving device 120 and then read out.

As the two or more devices 110, 120 are paired or matched to each other, e.g., as part of the manufacture and/or a pre-sales process, communication between the devices 110, 120 require little or no end-user setup or interaction. Any necessary information needed for matching or pairing the two devices 110, 120 are stored in a memory of each device prior to sale to the end user, such as storing in each device the identification, address and/or other information necessary for communication, including secure communication, such as authentication, encryption and decryption keys.

Once the devices 110, 120 are paired or matched, the devices 110, 120 appear to remain connected together regardless of the location of each device. Further, the devices 110, 120 are symmetrical so that images, messages or any data captured by the first device A 110 are made available to second device B 120 to be viewed at the second device B 120 at its user's or owner's convenience, and vice-versa. In one mode, content captured by one device is automatically rendered on the other matched device(s), e.g., displayed in the case where the content includes video. In addition, as the connection between the devices 110, 120 appears permanent, no addressing of messages is required. Thus in one embodiment, the act of capturing the message is all that is required in terms of user interaction. Sending the message/image between the first device A 110 and its matched pair 120 is automatic.

Figure 2:
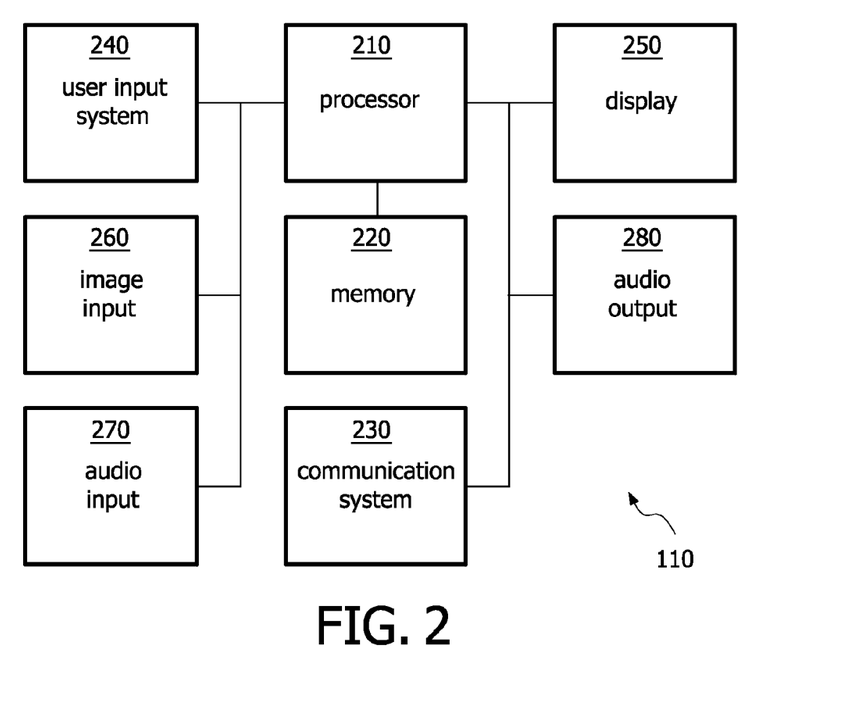
FIG. 2 shows a block diagram of a communication device according to one embodiment.

FIG. 2 shows a block diagram of each device 110, 120 shown in FIG. 1. As shown in FIG. 2, the device 110 or 120 includes a processor 210 which is operationally coupled to a memory 220 and a communication block 230. The communication block 230 may be used to communicate directly or indirectly to the other device in the pair, as well as to allow communication between the device 110 and external peripherals, such as cameras, large displays, microphones and/or speakers. The communication system may be wired and/or wireless using various protocols, such as the 802.11b/g, GPRS, USB, and/or Bluetooth™ protocols or connections, for example. Further ports may also be provided for connection of external peripherals to the matched device(s) to connect cameras, microphones, speakers and other sensors or detectors. Slots may also be provided to receive various cards, such as memory cards, or communication cards such as broadband cellular communication cards for connection to a cellular telephony network, for example.

The processor 210 is also operationally coupled to input/output devices such as a user input system 240, which my include buttons or keys that may be on a keyboard attachable to or integrated with the device 110, 120, or soft buttons displayed on a touch sensitive screen or display 250 of the device 110, 120. The display 250 may be a liquid crystal display (LCD), which may be touch sensitive, or any other type of display, used to present or display a user interface and show images (still or moving). The processor 210 is also operationally coupled to other devices, such as an RFID reader 430 for reading data from RFID tags, shown in FIG. 4.

The user input system 240 may be used to control the device 110 including selecting various modes, as well as capturing, storing, transmitting and rendering content. The user input system 240 and may include a touch screen covering the display, buttons surrounding the display a mouse, and/or a pointer in the case of a touch sensitive display for example. In addition or alternately, other types of input devices may be provided, for instance, RFID tag readers or other devices that may also be used to influence the function of the paired devices 110, 120, e.g., by reading RFID tags for pairing or matching devices, set-up, mode selection or changing the function of the paired devices 110, 120, such as playing a game read by the RFID tag reader from an RFID positioned near the RFID tag reader.

An image input device 260, such as a camera or scanner, is operationally coupled to processor 210 for capturing images or any video data. The image input device 260 may be used to capture still and/or moving images, and may be a camera built into the frame of the device, or connected to the device via the communications system 230. In addition or alternately, the image input device 260 may also include a card reader, capable of reading memory cards from digital cameras, for example, thus allowing the first device 110 to send an image from a digital camera to its matched pair 120.

Any type of data, such as audio, video, text and/or other type of data provided or captured by the first device 110, may be stored in the memory 220 of the first device, in addition to being available to the second device 120 which is matched with the first device 110. Further, any of the various blocks may be attachable to or integrated with the device 110, 120.

Each device 110, 120 also includes an audio input device 270, such as a microphone to capture audio data, such as audio messages or the audio track of a video message. The audio data and/or other data may be stored in the memory 220 and/or transmitted to the matched device through the communication block 230. The microphone and associated analog capture hardware may be built into the frame of the device 110, 120.

In addition to a video output device, e.g., the display 250, an audio output device 270, such as speakers, may also be operationally coupled to the processor 210. The audio output device 270 may be used to replay the audio component of messages and/or may be used as part of the user interface. The audio output device 270 may be implemented using one or more speakers built into the device frame with the associated digital to analog hardware. A further embodiment may include various sockets, such as audio/video IN/OUT sockets for connection to a headphone, microphone, camera, display, etc.

Communication between the matched devices 110, 120, e.g., via the respective communication blocks 230, may be direct such as through wired or wireless/cellular telephony or through other networks such as the Internet. In addition or alternately, communication between the devices 110, 120 may be indirect via a server, for example.

In one embodiment, the mutual identities of matched devices 110, 120 in a pair are programmed into each device 110, 120 as part of the manufacturing (or a pre-sales) process. The pair of devices 110, 120 may be sold as a matched pair. Although a pair of matched devices is described for simplicity, it should be understood that any number of devices may be matched by programming, e.g., pre or post sale, in each device all the identities of devices that are matched. Once purchased or programmed with the identity or identities of the matched devices, the devices may be physically be in different locations, but they remain able to communicate with each other without the owners needing to know the locations of the matched devices.

In one embodiment, the devices 110, 120 may communicate directly with each other using a peer to peer connection, such as General Packet Radio Service (GPRS), a cellular phone network, and/or even a normal phone line using a built in modem, for example. In addition or alternately, a server may be used as an intermediary for communication between or among the matched devices. Using a server has the added advantages of not needing to store all pending messages on the devices themselves, and not needing the devices to be switched on all the time. Message exchanged between the two devices may be encrypted as is well known in the art using various keys known to both devices, such as stored pre-sale, e.g., by the manufacturer, or keys that may be generated by the devices 110, 120 using a known seed, for example. A further advantage of having the pairing hard wired into the devices (e.g., having the identity of one device stored in the memory of the other device) is that it becomes simpler to implement encryption of any messages between the devices 110, 120, since, for example, there is no need for a secure mechanism for exchanging encryption keys.

Figure 3:
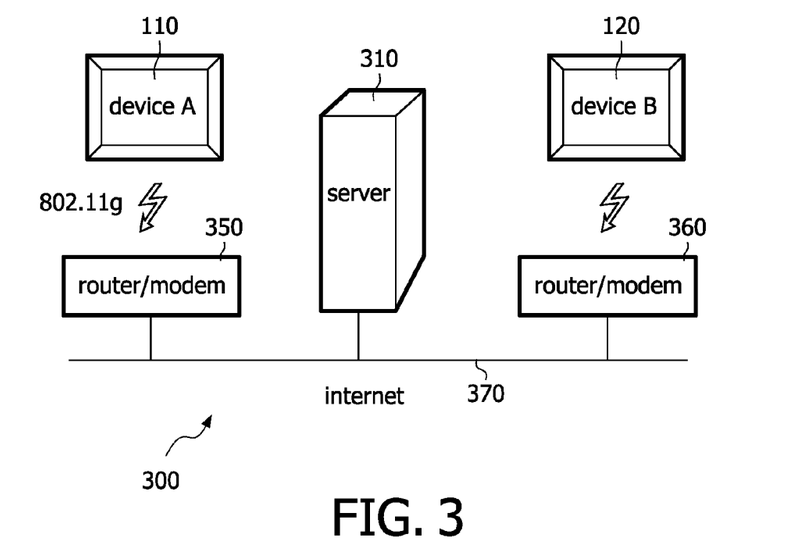
FIG. 3 shows a communication system according to one embodiment.

FIG. 3 shows an illustrative example of implementation or system 300 of the paired devices 110, 120. In this example, two matched devices 110, 120 are connected together using a server 310 as an intermediary. The communication medium 370 used may be the internet, with the devices 110, 120 connecting to it using the 802.11g wireless ethernet protocol via a respective commonly available routing device 350, 360.

Figure 4:
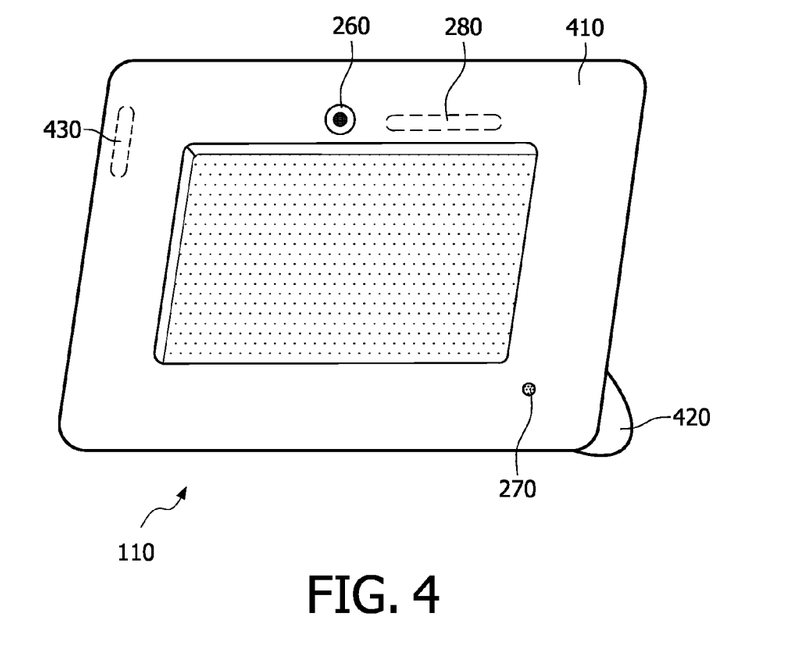
FIG. 4 shows a communication device according to one embodiment.

In this embodiment, the communication block 230 shown in FIG. 2 is an 802.11g wireless Ethernet device. Each device uses the 802.11g wireless device 230 to connect to the Internet 370, to connect to the server 310, where the IP address of the server 310 is known to each of the paired or matched devices 110, 120. The server may simply be a processor with memory, such as random access memory (RAM) and a hard disk memory, for example, with a connection to the Internet 370. FIG. 4 shows an illustrative embodiment of a device 110 that may be matched to other devices 120. As shown in FIG. 4, the device 110 includes a touch sensitive LCD display 250 surrounded by a frame 410 and has a stand 420 for standing the display on a surface, to resemble a picture frame. A camera 260 and a microphone are incorporated in the frame 410. Further, the frame 410 or device 110 may include one or more speakers 280 and an RFID tag reader 430.

Operation of the devices 110, 120 will now be described using two illustrative scenarios. In the first scenario, the first device 110 sends a message to its partner or the second device 120, and the second scenario describes how a device receives a previously sent message.

In one embodiment related to transmission of messages, such as where the owner of the first device A 110 wishes to send a message, the following operations may be carried out. The user or owner of the first device 110 indicates that it is desired to send a message, e.g., by pushing a button, which may be a hardware key on the frame 510 or a software key displayed on the touch screen 250. The device 110 may be configured that by simply touching the screen 250 anywhere initiates a process that may include various operations, such as recording a message or selecting a message stored in the memory for transmission to the second device 120.

Illustratively, touching the screen 250 of the first device 110 initiates recording of images and/or audio and storage in the device memory 220. Touching the screen 250 again, either anywhere or at some designated area such as a displayed soft key, indicates that the message is completed. It should be understood that in various embodiments, touching the screen may result in the display of one or more soft keys and/or menus of actions for selection by the user, such as start recording, save, read from memory, send, etc. One or more soft keys and/or dialogue boxes and menus may be displayed to prompt the reader for a next action or selection of a next action from a plurality of choice displayed on the screen, for example.

Upon completion of the recording or storage of content, whether video, audio, text or any other type of data or information, the processor 210 of the first device A 110 is configured to convert the captured or stored message or content, e.g., images and audio, into a transmission format, which may be any format understood by the partner or second device B 120. The first device 110 may optionally encrypt the message using a key only known to the second device B 120. Next, the first device 110 contacts the server 310 at the known IP address. In turn, the server 310 authenticates the identity of the first device 110 using any authentication means as is well known in the art. After successful authentication, the server 310 uploads the message along with the ID of the recipient or second device 120 obtained from the first device, such as included with the message transmitted by the first device 110 to the server 310. Of course, the server may have in its memory a list that indicates the matching, e.g., the identities and addresses of the matched devices 110, 120, in which case, merely the identity of the first device 110 is transmitted to server 310 without transmission of information (e.g., the identities and addresses) of the second device 120 since, upon authentication, server 310 may obtain the necessary information of second device 120 from the list stored in the memory of the server 310. Next, the server 310 stores the message waiting to be contacted by the second device B 120.

In another scenario or embodiment related to reception of messages, such as when the owner of the second device B 120 wishes to receive a message, the following operations may be carried out. The second device B 120 automatically checks, e.g., periodically polls the server 310 for new messages at periodic intervals without user interaction, for example, by contacting the server 310. Upon contacting the server, the second device B 120 authenticates itself. In response to being contacted by the second device 120, the server 310 may send a new message, which may be the last message or may be based on other preselected criteria (e.g., by a user, owner etc.) such as the last video, audio, text and/or any other type of message, for example. Additionally or alternately, the server 310 may send an indication of the number of waiting messages. For example, if there are any messages waiting, this fact is indicated as a displayed message on the display of the second or receiving device 120, such as indicating the number and/or type of messages.

The owner of the second device B 120, e.g., seeing the indication of a waiting message, signals the wish to view the message using the touch screen, e.g., by touching it the screen or a designated portion where a soft key may be displayed. The second device B 120 may then carry out the following steps.

The second device B 120 contacts the server 310 and authenticates itself. The second device 120 then requests and downloads the latest message(s). If encryption had been used, then the second device 120 decrypts the message. The second device 120 may now display the message, replacing any previous message on the screen, for example. Further user interaction may be performed to playback the message if it contains moving video or audio, for example.

Of course, in a fully automatic mode, a content captured by one device is automatically rendered on the second device without any user interaction. Various modifications and modes may be employed and selected by the user(s), such as touching the screen of the sending device to transmit content, and touching the screen of the receiving device to receive content, e.g., that may be stored and waiting at the server 310, and/or render or select content already receive and stored at the receiving device.

The matched two or more devices, which are uniquely coupled to each other in a similar way as a set of 'walkie-talkies' (also called two-way radio), allow content stored or captured in one device to automatically be available or be rendered at the other matched device(s), thus providing a simple communication and/or monitoring system. In a monitor mode, the data or content captured by input devices of one matched device 110, such as video/audio signals from the camera 260 and microphone 270, are automatically rendered or available for rendering at the other matched device(s) 120.

In another embodiment, the matched device 110 may also include sensors configured to detect the presence of a person, such as a motion sensor. A further sensor, such as a camera with appropriate software running on the processor 210 may be configured to identify a nearby person, using well known means, such as face recognition including comparison of the a face of the nearby person with faces stored in the memory 220, for example. In one mode, instead of looping a video clip or a slide show indefinitely, or constantly displaying a still image, the video clip or any other data or message may only be rendered, e.g., shown on the display 250, when a human is near the frame or one of the matched devices 110, 120. In the case of image recognition sensors and systems, upon recognizing the person near the frame 110, then a particular message associated with or directed to the recognized person may be rendered by one or both matched frames/devices 110, 120.

Thus, in addition to sending photo or audio/video messages from one location to another between the matched devices 110, 120, a matched device or frame 110 may be configured to show still images (including a looping slide show or a looping video clip) much like a photo frame in "inactive" mode, when no user is actively sending or watching a message (and the device is not in power off/standby mode). The still image(s) or any content may be selected by the local user (of the local matched device 110 and/or the remote user of the remote or other matched device 120) for being rendered in the inactive mode with no communication between the matched devices 110, 120.

Triggers that initiate rendering, such as detecting the presence or identification of a person near the frame 110, may be used to not only trigger behavior of a local frame or matched device, but also trigger the remote or the other frame or matched device. Thus, one or both matched devices 110, 120 may be triggered by a single trigger detected by one of the matched devices 110, 120. The processing, such as image recognition, may be performed locally by the local processor 210, or by the server 310 which typically may be configured to perform more complex algorithms to determine the most appropriate action for the matched terminal devices 110, 120, hence reducing hardware requirements and hence the costs on the matched devices 110, 120. Thus, in peer-to-peer systems that do not utilize a service in the middle, such as the server 310, the terminal devices 110, 120 are configured to handle everything including the necessary storage and processing of data. Allowing a service in the middle reduces hardware requirements and hence the bill of material for the terminal devices.

Various benefits may be realized from using triggers to initiate rendering. In a messaging context, a specifically triggered behavior, such as automatically replaying the last message when a human passes or changing the speed or rate of change of a slideshow rendering, may result in additional use of the system by encouraging a return message. In a picture frame context, looping video clips may be annoying or ineffective in drawing someone's attention to the clip. These negative effect may be avoided by showing a still image (like a key frame as a visual title of the message) that turns into a playing video clip, or a fast or slow slideshow, only when a user or person passes by, or is looking at the matched device 100.

Further, in end-to-end connectivity systems, relaying information about activities on one end to the other should be done in a well considered manner. Too explicit information (e.g. like showing a live video) may be considered intrusive and privacy invading. Using a local trigger to activate the rendering, e.g., the display of previously recorded content (e.g. such as the last sent message) on the remote end is much more acceptable.

Activating the matched device(s) in response to triggers combines in an advantageous way intrinsic features of a static information display with interactiveness triggered by situational sensors. Various benefits may be realized for single ended systems as well as for end-to-end systems.

One of the simplest triggers is detecting motion in the vicinity of the device, but triggers may also involve more complex technology such as being based on face detection, gaze detection or even face identification. Computing a complex trigger event, e.g., face detection, may be done locally or on the server. Triggers may also be based on behavioral patterns where data is collected and processed over a time span, such as days, weeks, months, or longer to form a profile that includes expected behavioral patterns. Thus, the processor of the matched device or server may be configured to generate a trigger upon detection of a behavior which is not expected as derived from a comparison or analysis of the profile, such as grandma turning on the light at 2 P.M. when typically she does not do so, as ascertained from the profile that includes historical data as well as historical and expected behavioral patterns.

Various triggers may be used with associated actions. The following are illustrative triggers and corresponding actions which may take place both on the local and/or the remote matched devices 110, 120, in response to detection by sensor(s) which may be integrated with or attached to one or both of the matched devices 110, 120, where respective or associated rendering may be performed by one or both of the matched devices 110, 120:

Light/darkness sensor(s) that detects ambient light near one or both of the matched devices 110, 120, and depending on the amount of detected ambient light, a daylight, bright and/or a night time, dark picture may be displayed on one or both of the matched devices 110, 120;

Location/directional sensors, such as a focus camera that detects the location and/or direction of the user near a matched device, and in response to the detected use location or direction, the processor 210 may optimize display and audio output and input for the location or the direction of the user; and Motion sensor (s) and/or person detector(s)/identifier(s) that detect motion and/or identify a person, and in response the processor 210 may replay the last video message, for example, and/or increase/decrease speed of slideshow until the next trigger or as long as the person and/or face is detected.

Other sensors or triggers may include gaze detectors that detect a person gazing or staring at on one or both of the matched devices 110, 120 and, in response to such detection, the processor 210 may replay last video message, increase/decrease speed of slideshow as long as person is gazing at the screen of one or both of the matched devices 110, 120. In the case of face or person identification, the processor 210 may play messages specific for or associated with the identified person, e.g. show only images of the identified person on the remote end, or display messages having identifiers associated with the identified person. In another embodiment, if both users such as grandma and child of the two matched devices 110, 120 are detected to be present near their respective matched devices 110, 120, then an indication of detection of both users may be presented on each of the matched devices 110, 120. So both grandma and child know that the other is near the frame which may encourage further communication through the matched devices 110, 120. For example, an icon that includes (one or) two faces is displayed on each matched devices 110, 120 to indicate that both users (i.e., grandma and child) are detected near the matched devices 110, 120.

In general, actions may depend in a more complex and subtle way on trigger, e.g., with respect to performing remote end actions (e.g., rending on the remote matched device) based on local triggers (detected by the local matched device) in an end-to-end system. For example, assume that the remote end at a child's place shows a general slideshow of family pictures. If Grandma is actively moving around on her (local) end being at a different location, then images that show Grandma may be included more frequently in the shown slideshow shown at the remote end where the child and the remote matched device are located.

To realize these more complex behaviors, the server 310 that is connecting the two ends may be used. For example, the local matched device 110 indicates to the server 310, how active Grandma is on her (local) end, the server includes algorithm to determine the appropriate action at the (remote) child's end, matched device 120. By this, the end devices 110, 120 may be as simple as possible in terms of computing power to execute complex algorithms.

Different triggers may be combined, including triggers that appear on both ends 110, 120, or triggers that appear at the same time but are of different nature per end. For example, detecting light during night time at Grandma's place may trigger a different behavior as during evening hours. Alternatively or in addition, as another example, the last video message may be only replayed if human presence is detected on both ends 110, 120. This again is realized by the server 310 that connects both ends 110, 120 to reduce complexity of the terminal devices 110, 120.

Thus, the system includes matched devices 110, 120 which are located at two different ends or locations. The matched devices 110, 120 comprise a display, speakers, a camera and input sensors (e.g. touch screen or buttons). The matched devices 110, 120 may also have sensors that allow detecting and/or deriving situational context, and generating indicators, e.g., "a human is active near the terminal device", or "Grandma is active on her end", or "Grandma is active on her end AND there is human activity on the other end". Such indicators related to detection or trigger on a local device may be communicated and rendered as indicators on the remote device. The system is configured to allow a user to actively/manually send still images, audio only messages or audio/video messages to the other end. Further, the system may also be configured to allow a user to actively/manually retrieve messages that have been sent. Additionally, in non-active phases (i.e. no explicit user interaction), the system may also be configured to automatically show a slideshow of recent message photos, or of stored digital photos (e.g., stored locally or remotely at the remote device and/or the server 310), like a normal digital photo frame.

In one embodiment, the server 310 connects both ends 110, 120 in a private manner to ensure data and content security and privacy. Once, a trigger is detected, the local device 110 determines its appropriate actions responsive to the trigger based on stored data that associated triggers with actions, for example. Alternatively or in addition, the detected trigger may be sent to the server 310 determine the appropriate action or the trigger response may be determined and rendered locally without involvement of the server 310. It may be desirable to involve the server 310 in processing the trigger information and deciding the appropriate action based on the trigger information and communication status it received from both ends, for example. The processing, e.g., by the server 310 may also take into account user preferences and history data, to decide which action to trigger at which end of the end-to-end system.

Of course, any other input devices, sensors or triggers may be used or provided such as temperature, smoke and motions sensors to provide for security monitoring for fires and unauthorized intrusions at the location of the one of the matched devices. Further, other uses may be envisioned such as real time videoconferencing, messaging including storing messages in one or more mailboxes associated with different users of the receiving matched device, where identification of the sending matched device is included in the stored message particularly in the case where there are more than two matched devices. Communication between or among the matched devices may be through any communication link, wired, or wireless, direct or indirect such as through a server via any network such as the internet, a telephone network or a satellite network, etc.

One of the matched devices may have supervisory authority (master device) to control other matched and devices (slave devices) where content displayed on the slave devices may be selected by the master device. Further, the master may control sensors and actuators connectable to the slave device to detect various aspects at the location of the slave device, such as to control temperature, lighting, locking doors etc. Further, sensors connectable to the matched devices may be worn by the user to detect and monitor biological function, such as the user heart rate for example, where user vital signs or other sensed data are transmitted to the local device via Bluetooth™ or any other communication protocol, for example, thus becoming available or being automatically rendered at another matched device, e.g., at the master device located at a remote location different from the location of the user and/or the slave device.

Communication may be seamlessly switched from one communication level or medium to another. For instance, a user may travel with a matched device that detects a communication network in a new environment, such as a hotel room, or may communicate using a cellular phone network, such as linking to the mobile phone of the user through Bluetooth™, for example. That is, the processor 210 may be configured to automatically detect and ascertain resources at the current location of the matched first device 110 to automatically effectuate communication with the second matched device 120.

As exemplary scenarios, grandma touches the screen 250 of the first device 110 to initiate sending a message, and a message is captured using internal camera 260 and microphone 270. The message is then sent to the server 310 for the paired frame or second device 120 to pick up. The second device 120 regularly polls the server 310. The server 310 indicates a new message has been sent by the first device 110 and an alert is shown on screen of the second device 120. The grandchild touches the screen of the second device 120 to access the new message which is now displayed, e.g., grandma's photo and voice. In one mode, the received grandma's photo may remain displayed in the second device 120, which may the form of a picture frame, until it is changed, e.g., by the user of the second device, or upon reception of another photo or video.

Other uses of the matched devices 110, 120 may including sending still pictures from in-built camera; sending still pictures from an external digital camera connected to the device; sending still pictures from in-built camera at regular intervals; remote playing of games based on two (or more) players such as Battleships, Chess; ordering prints of pictures received or printing them through an external printer connected to the device; narrating or listening to a story; lifestyle and medical monitoring of an elderly relative (remote display from additional sensors); real-time video chat with additional hardware for real-time encoding, as necessary, and the like.

The matched devices require minimal user interaction and setup. For example, returning to the illustrative scenario, Grandma, who got the first device 110, didn't have broadband so she bought the recommended service with a wireless modem. She plugs in the picture frame or first device 110 and a router 350 connected to the service provider, e.g., via a coaxial or fiber optic cable. The router 350 wirelessly communicates with the first device 110 e.g., using the 802.11g wireless Ethernet protocol. The picture frame or first device 110 directs grandma to put an RFID installation card next to the first device 110 for reading information e.g., via the RFID tag reader 430 of the first device 110. This configures the modem and the frame or first device 110 registers with server 310. The server 310 indicates that the matched frame or first device 110 is not yet registered and invites grandma to send a welcome message.

The grandchildren already have broadband and a wireless network and router, so they plug in the second device 120 which the wireless network and registers with the server 310. The server 310 indicates a message has been sent and an alert is shown on the screen of the second device 120. One of the grandchildren touches the screen to access the new message.

In another illustrative example, grandma touches the screen 250 to initiate sending a photo. A picture is previewed using the internal camera 260. Grandma touches the screen 250 again to take and/or store the picture. The picture is then sent to the server 310 for pick-up by the paired frame or second device 120. The devices 110, 120 regularly poll the server 310. The server indicates to the second device 120 that a new photo has been sent by the first device 110. An alert or indication is shown on the screen of the second device 120. The grandchild touches the screen 250 of the second device 120 to access the new photo. After the new photo is displayed, the main photo is again displayed on frame. Alternatively, the new photo remains displayed on the screen until further action by the user or grandchild of the second device 120 that received the new photo.

In a further embodiment, instead of the matched communication devices 110, 120 always displaying a previously received image (analogous to a photo frame), the currently displayed image may degrade over time. By allowing the displayed image to degrade over time, the owner receives feedback on the amount of time that passed since the last time an action was performed and/or a trigger was detected, such as the last time the matched device sent or received a message. Once the owner of the local matched device sends or receives a new message to the companion (remote) matched device, the image displayed on the local matched device may be restored to the original state, and degradation may restart again. The processor the local matched device or the processor of the server 310 may be configured to perform the degradation or distortion of the currently displayed image over time, such as by gradually fading the image to white, for example, or any other distortion/degradation.

Such image distortion/degradation provides reminders to communicate, thus improving the relationship between the owners of the matched devices 110, 120 by regular contact (via the matched devices 110, 120). Thus, more frequent communication is encouraged by providing feedback when the device hasn't been used for a while, and by actively encouraging an owner to send a message, in order to restore the currently displayed image.

The processor of a matched device or of the server may be configured to modify or degrade the displayed image by causing the rendering, e.g., the display, of a new version of the image by applying a filter that uses the age of the image as an input parameter. Many filters may be used. In the case where an image is degraded by being gradually faded to white, the following filtering may be applied for each pixel of the image.

Assuming the age at which the image should be totally white is "A", and the current age of the image is less than "A" (if the image is older, then a totally white image is displayed), then:

$$\text{new\_pixel\_value} = (\text{white} * (\text{age}/A)) + (\text{pixel} * (1 - \text{age}/A))$$

Of course, many other type of filters and algorithms may be used to provide any desired type of degradation, such as linear and non linear filters, filters that may be applied to degrade the image on a pixel per pixel basis, filters that may use input from larger areas of the input image such as degrading portions of the image on a portion per portion basis, etc.

In yet another illustrative example, the grandchild takes pictures with an external digital camera. The grandchild takes the memory or SD card from the camera and puts the memory card into a slot of the frame 410 of the matched device 120. The data, e.g., the pictures, are read from the removable memory card inserted in the card reader slot, and the read pictures are displayed on the screen 250 of the second device 120. The grandchild touches the frame or screen to select a picture. The selected picture is then sent to the server 310 for the paired frame 110 to pick up. The receiving frame 110 regularly polls the server 310 which indicates a new photo has been sent by the transmitting frame 120. An alert is shown on the screen 250 of the receiving frame 110. Grandma touches the screen 250 to access the newly received photo. After the new photo is displayed, the main photo is again displayed on frame 120, for example.

The matched devices 110, 120 may also have a guardian angel mode. For example, a family buys set of sensors and control box. The sensors are placed around the house. An RFID card from the sensor kit is put next to the first device 110 to associates this set of sensors with the matched frames 110, 120. One of more matched devices 110 may monitor and report the status of the sensors. If Grandma has multiple matched frames or devices at different locations or rooms, then this can be repeated and additional sensors monitored at the various locations or rooms throughout a house, for example. The two or more matches frames or devices regularly poll the server 310 that indicates a set of sensors has been added to the other location(s), which may be another room in a house, or another house remote from grandma's house. At the matched device(s), an overlay or icons may be displayed of summary information of data sensed by the various sensors the sensors. Touching a displayed icon brings up more detailed and historical data related to the icon.

In a further embodiment, the matched devices may be configured to react to the location of the users or owners. The location of the user or owner of one of the matched devices 110, 120 may be determined, such as via cell identifier (ID) of a mobile wireless cellular phone, such as a Global System for Mobile communications (GSM) phone, of the user/owner. The owner's location is used to change the photo to give a representation of the location or any change of location. For example, the matched devices 110, 120 may communicate with the user's mobile phone, and report the cell ID of the user's mobile phone back to the server 310 to enables the matched devices 110, 120 to react to a change in the location of the user(s).

Of course, the server 310 may be configured to directly communicate with the mobile phone(s) of the user(s) to ascertain or determine the location of the user(s), and control the matched devices based on the determined location(s). For example, as the user travels, the user's mobile phone or any other location device (e.g., a Global Positioning System (GPS) device) transmits its current location back to the server 310. An associated communication and control device may then react appropriately, based on the user location, such as changing the picture on the display of one or both matched devices 110, 120, or rendering any other type of data. For example, such a system may be used to prevent communication at an inconvenient time. If the system knows the current location of the remote person at the other end, then the local user of a local matched device 110, may decide whether or not it is appropriate to communicate, e.g., send messages to the remote matched device 120. Further, even if a local user sends a message, the server 310 decide that it is not appropriate to deliver the message to the remote matched device, and instead store the message for delivery at a later more appropriate time. Of course, the server 310 may be configured to notify the local user of the decision to delay message delivery until further time, which may be estimated and included in the notification. Thus, data may be exchanged without user interaction between the matched devices, directly or through one or more server providers, including one associated with the server 310, for example. The server 310 may be configured to determine the appropriate time based on the location information of the remote user or further information, such as input from the remote (and/or local) user. Further, the matched devices may be configured to provide the owners/users locations in a non invasive manner. Delivery and notification of the remote user location to the local user may alleviate any worries about the remote users/owners (e.g., elderly remote users) because they cannot be otherwise reached, for example.

In another embodiment, message traffic between the matched devices 11, 120 may be monitored at the remote server 310 which is part of the overall end-to-end system which may be managed by a service provider. The presence of messaging traffic would indicate that an elderly person is active using one of the matched devices. However, if such a user, e.g., the elderly person, becomes ill or incapacitated, then the absence of traffic may be used to indicate that this user is ill and may need some assistance.

Figure 5:
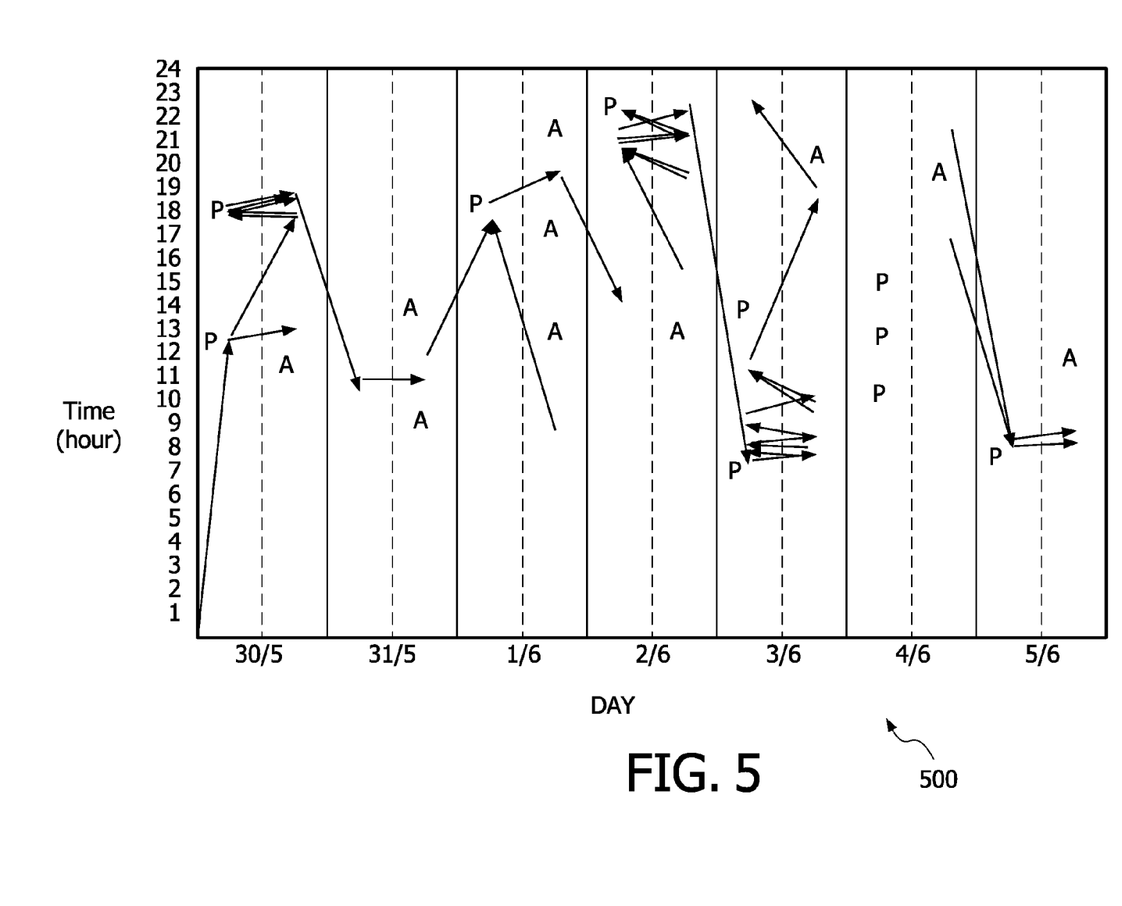
FIG. 5 shows a communication and traffic flow diagram according to another embodiment.

FIG. 5 shows an illustrative communication and traffic flow diagram 500 between two matched devices 110, 120 over the course of a week (where the x-axis is in days), as monitored and recorded by the server 310, where the y-axis is from 1 to 24 hours of the day. The traffic flow may include date, time and type of traffic such as photo P, audio A and other data types, such as video and playing games.

The traffic flow 500 between two matched devices 110, 120 is automatically monitored by the server 310. The server 310 may be configured, e.g., via software running on the processor of the server, to monitor and analyze the traffic flow in order to detect trends in the traffic. In particular, the server 310 recognizes and normalizes patterns of behavior and flags when traffic flow stops for a period of time which is outside the norm, and sends a message (via Short Message Service (SMS) or pre-recorded phone message, for example) to a stored emergency contact number.

For example, if the traffic flow shows no communication from one of the devices over a predetermined period of time which may be selectable or programmable, then an alert message may be sent by the server 310 to a third party and/or to one or both matched devices 110, 120. Accordingly, the processor of the device(s) and/or of the server 310 may be configured to generate and send alert messages when an expected behavior does not occur, or an unexpected behavior occurs, as determined form the traffic flow patterns and/or from the user profile (generated from historical data) as compared with current traffic flow and/or user behavior. For example, current traffic flow and/or current user behavior may be compared with the stored traffic flow patterns and/or the stored user profile, e.g., stored in a memory of the server and/or a memory of the matched device(s), and alert messages may be sent based on the comparison results or determination of unexpected current traffic/behavior.

The alert message may be in the form of an SMS message to a family member received on a mobile device or phone, for example, to alert or flag that there is some concern about owner(s) of at least one of the matched devices 110, 120. The alert message recipient, such as the family member, may then take appropriate action, such as checking that the other or remote owner, or checking that the owner(s) of the matched devices 110, 120 are not in need of help by calling or visiting, for example. The server 310 may also be configured to make an automatic call to a neighbor or a care organization to suggest that a check should be made on the person(s) who own(s) the device(s) from which there is no traffic or input. Accordingly, help may be summoned automatically, without any interaction of the owner of the matched device who may be ill, for example.

Illustratively, the matched devices may have wireless, e.g., cellular or satellite, access to the internet, such as a mobile broadband communication card, which may be removable and insertable in a communication slot of the matched device (s) to provide access to the Internet or other networks. Although a picture frame has been described as one embodiment, any device or shape may be used to provide matched communication and monitoring. For example, personal digital assistants (PDA) may be pre-matched for communication and monitoring.

The processor 210 may be any type of controller or processor, such as those described in U.S. 2003/0057887 which is incorporated herein by reference in its entirety, that is capable of providing control signals in response to input signals from the input/output devices, e.g., for selecting modes of operation, capturing and storing information in the memory 220, transmitting and receiving information, executing instruction stored in the memory 220, which may be any type of memory, RAM, ROM, removable memory, CD-ROM, and the like, also as described in U.S. 2003/0057887. It should be understood that the processor 210, memory 220, input/output devices 240, 250, 260, 270, 280 although shown as being part of the device 110, may be integrated units, or separate units alone or in combination with other units.

The memory 220 and other memories may be any type of device for storing information and programming application data. The programming application data and other data are received by the one or more processors for configuring the one or more processors to perform operation acts in accordance with the present system. The operation acts may include controlling the device 110 to display a graphical user interface (GUI) for user interaction with the present system, and configuring the one or more processors. The input device 240 may further include a keyboard, mouse, trackball, or other device, such as the touch sensitive display 250 or further display, which may be stand alone or be a part of a system, such as part of a personal computer, personal digital assistant, any rendering device (e.g., MP3 player) and/or display device for communicating with the processor 210 via any type of link, such as a wired or wireless link. The user input device is operable for interacting with the processor including interaction within a paradigm of a GUI for interaction with elements of the present system. Clearly the one or more processors, memories, displays, and/or user input devices may all or partly be a portion of a computer system or other device.

The methods of the present system are particularly suited to be carried out by a computer software program, such program containing modules corresponding to one or more of the individual steps or acts described and/or envisioned by the present system. Such program and elements thereof may of course be embodied in a computer-readable medium, such as an integrated chip, a peripheral device or memory, and/or other one or more memories coupled to the one or more processors.

One or more of the memories may be any recordable medium (e.g., RAM, ROM, removable memory, CD-ROM, hard drives, DVD, floppy disks or memory cards) or may be a transmission medium (e.g., a network comprising fiber-optics, the world-wide web, cables, a wireless channel using time-division multiple access, code-division multiple access, other radio-frequency and/or wireless communication channel). Any medium known or developed that may store and/or transmit information suitable for use with a computer system, processor, etc., may be used as one or more of the memories.

These memories may configure the processor to render the GUIs and implement the methods, operational acts, and functions disclosed herein. The memories may be distributed or local and the processor, where additional processors may be provided, may also be distributed or may be singular. For example, the GUI may be embedded in a web-based application that is wholly or partially provided by a remote processor. The memories may be implemented as electrical, magnetic or optical memory, or any combination of these or other types of storage devices. Moreover, the term "memory" should be construed broadly enough to encompass any information able to be read from or written to an address in the addressable space accessible by a processor. With this definition, information on a network is still within the memory, for instance, because the processor may retrieve the information from the network for operation in accordance with the present system.

The one or more processors may be capable of providing control signals and/or performing operations in response to input signals and executing instructions stored in the one or more memories. The input signals may be from any user input device including the camera 260, microphone 270, motion, heat, smoke sensors, and medical monitoring sensors that may be attached to a monitored user of the device 110.

One or more of the processors may be an application-specific and/or general-use integrated circuit(s). Further, the processors may be a dedicated processor for performing in accordance with the present system and/or may be general-purpose processors wherein only one of many functions operates for performing in accordance with the present system. The one or more processors may operate utilizing a program portion, multiple program segments, and/or may be a hardware device utilizing a dedicated or multi-purpose integrated circuit. Further, in a distributed system, portions of an operation may be performed on one device with data generated therefrom being transferred to one or more further devices.

Of course, it is to be appreciated that any one of the above embodiments or processes may be combined with one or more other embodiments and/or processes or be separated and/or performed amongst separate devices or device portions in accordance with the present system.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

The invention claimed is:

1. A communication system comprising:
a first device;
a second device, the first device and second device being matched to each other, wherein said matching comprising each device having built-in knowledge of the other's identity as part of one of: a manufacture and a pre-sales process and an action on selected content on one device initiates transmission of the selected content to the other device; each of the first device and the second device comprising:
an input device for capturing content;
a memory for storing the content; and
a renderer configured to render the selected content under the control of at least one processor which is configured to affect rendering of the content on at least one of the first device and the second device in response to at least one trigger, the at least one trigger being generated in response to at least one of:
detection of a user of the device;
passage of time the content has been rendered since a previous trigger;
location of the user;
behavioral pattern of the user; and
traffic flow patterns between the first device and the second device.

2. The communication system of claim 1, wherein the detection includes identification of the user to render content associated with the identified user.

3. The communication system of claim 1, wherein the at least one processor is further configured to degrade the content with the passage of time; and
providing an indication at an expiration of the passage of time.

4. The communication of claim 1, wherein the location of the user is determined from a mobile telephone of the user.

5. The communication system of claim 1 wherein, in response to the detection of the user near the first device, the at least one processor is configured to at least one of: replay a last message and change a rate of a slideshow.

6. The communication system of claim 1, wherein the detection of the user include at least one of: identifying the user and detecting a gaze of the user toward the first device.

7. The communication system of claim 1, wherein the at least one processor is further configured to render an indication on at least one of the first device and the second device that both users are detected near the first device and the second device.

8. The communication system of claim 1, wherein the at least one processor is further configured to determine an appropriate time to deliver a message to at least one of the first device and the second device based on the location of the user.

9. The communication system of claim 1, wherein the at least one processor is further configured to send an alert signal to at least one of: a third party, the first device and the second device, when no communication is detected from one of the first device and the second device after a predetermined period of time.

10. The communication system of claim 9, wherein the at least one processor is further configured to generate the alert signal based on at least one of: an unexpected behavior of the user and an unexpected traffic pattern as determined from a behavioral pattern and traffic flow patterns between said first and second devices.

11. A communication device comprising:
an input device for capturing content;
a memory for storing the content; and
a renderer configured to render the content under the control of at least one processor which is configured to cause rendering of the content on at least one of the communication device and a further communication device in response to at least one trigger, wherein the communication device and the further communication device are matched, said matching comprising each device having built-in knowledge of the other's identity as part of one of: a manufacture and a pre-sales process and an action on selected content on one device initiates transmission of the selected content to the other device, the at least one trigger being generated in response to at least one of:
detection of a user of the communication device;
passage of time the content has been rendered since a previous trigger;
location of the user;
behavioral pattern of the user; and
traffic flow patterns between the communication device and the further communication device.

12. The communication device of claim 11, wherein the detection includes identification of the user to render content associated with the identified user.

13. The communication device of claim 11, wherein the at least one processor is further configured to degrade the content with the passage of time; and
providing an indication at an expiration of the passage of time.

14. The communication device of claim 11, wherein the location of the user is determined from a mobile telephone of the user.

15. The communication device of claim 11 wherein, in response to the detection of the user near the communication device, the at least one processor is configured to at least one of: replay a last message and change a rate of a slideshow.

16. The communication device of claim 11, wherein the detection of the user includes at least one of: identifying the user and detecting a gaze of the user toward the communication device.

17. The communication device of claim 11, wherein the at least one processor is further configured to render an indication on at least one of the communication device and the further communication device that both users are detected near the communication device and the further communication device.

18. The communication device of claim 11, wherein the at least one processor is further configured to determine an appropriate time to deliver a message to at least one of the communication device and the further communication device based on the location of the user.

19. The communication device of claim 11, wherein the at least one processor is further configured to send an alert signal to at least one of: a third party, the communication device and the further communication device, when no communication is detected from one of the communication device and the further communication device after a predetermined period of time.

20. The communication device of claim 19, wherein the at least one processor is further configured to generate the alert signal based on at least one of: an unexpected behavior of the user and an unexpected traffic pattern as determined from a behavioral pattern and traffic flow patterns between the communication device and the further communication device.

21. A method for communication comprising the acts of:
matching a first device to a second device, said matching comprising each device having built-in knowledge of the other's identity as part of one of: a manufacture and a pre-sales process and an action on selected content on one device initiates transmission of the selected content to the other device;

controlling at least one of first device and the second device for rendering content and communicating between the first device and the second device; and causing the rendering of the selected content on at least one of the first device and the second device in response to at least one trigger, the at least one trigger being generated in response to at least one of:

detection of a user of the device;

passage of time the content has been rendered since a previous trigger;

location of the user;

behavioral pattern of the user; and traffic flow patterns between the first device and the second device.

* * * * *